United States Patent [19]
Barbier et al.

[11] 3,811,111
[45] May 14, 1974

[54] METHOD OF EXPLORING A MEDIUM BY TRANSMITTING ENERGY EMITTED IN THE FORM OF SEPARATE IMPULSES AND ITS APPLICATION TO SEISMIC PROSPECTING

[75] Inventors: Maurice Barbier, Ousse; Philippe Staron, Ris Orangis, both of France

[73] Assignee: Societe Anonyme dite: Societe Nationale Des Petroles

[22] Filed: June 12, 1972

[21] Appl. No.: 261,597

[30] Foreign Application Priority Data
June 14, 1971  France .............................. 71.21467

[52] U.S. Cl. ................. 340/15.5 CC, 340/15.5 TA, 340/15.5 AC, 324/77 A
[51] Int. Cl. .......................... G01v 1/14, G01v 1/22
[58] Field of Search............. 340/15.5 CC, 15.5 TA, 15.5 AC; 324/77 A

[56] References Cited
UNITED STATES PATENTS

| 2,989,726 | 6/1961 | Crawford et al. | 340/15.5 TA |
| 3,680,040 | 7/1972 | Silverman et al. | 340/15.5 TA |
| 3,332,511 | 7/1967 | Silverman | 340/15.5 TA |
| 3,736,554 | 5/1973 | Barbier | 340/7 R |
| 3,698,009 | 10/1972 | Barbier | 340/15.5 DP |
| 3,622,970 | 2/1972 | Barbier et al. | 340/15.5 CP |

Primary Examiner—Maynard R. Wilbur
Assistant Examiner—N. Moskowitz
Attorney, Agent, or Firm—Bacon & Thomas

[57] ABSTRACT

This invention concerns a method of exploring a medium by transmitting energy emitted in the form of separate impulses, and its application to seismic prospecting.

It is characterized by the fact that the long signal is emitted by a number of sources off-set laterally from one another and from the receiver, the moments of emission by each source being such that when the sequence of moments of emission by all the sources are intercorrelated with the sequence of moments of emission by any one source, a function is obtained, for a duration equal to the longest time taken by waves to travel both ways through the medium, the ratio of the amplitude of the maximum peak of this function to the amplitude of the secondary residues being approximately the same as the corresponding ratio for the autocorrelation function of the moments of emission of this same single source.

6 Claims, 2 Drawing Figures

METHOD OF EXPLORING A MEDIUM BY TRANSMITTING ENERGY EMITTED IN THE FORM OF SEPARATE IMPULSES AND ITS APPLICATION TO SEISMIC PROSPECTING

This invention concerns a method of exploring a medium by transmitting energy emitted in the form of separate impulses, and its application to seismic prospecting.

Existing methods of seismic prospection consist of emitting a long signal, propagated in the medium in the form of waves, which, after being reflected by at least one reflector, are detected and recorded in the form of signals, which are then intercorrelated with the signal emitted, in order to measure the time taken by the waves to travel both ways through the medium; the long signal consists of a sequence of separate energy impulses of approximately uniform amplitude, the number being determined so that, in a way known in the previous art, the autocorrelation function of the signal emitted presents correlation residues of an amplitude below a given fraction of the maximum amplitude of this function.

Although this method can easily be applied, with efficient use of the mechanical energy used to emit the sequence of impulses, and supplies satisfactory definition of reflectors when the source of acoustic waves is moved, it cannot provide practical information on different seismic sections simultaneously. Consequently, exploration of any given geological layer involves immobilizing the prospecting device for quite a long period, with a resulting increase in the cost per kilometre of seismic profile.

The invention concerns an improvement on existing prospecting methods, offering the possibility of obtaining several different seismic sections with one receiver system and in the same length of time, in other words more information on the subsoil without longer immobilization of the prospecting device, bringing about a significant reduction in the cost of establishing the seismic profile for a region.

This invention concerns an improvement to the method of exploring a medium in which a long signal is emitted, consisting of a sequence of separate energy impulses of roughly uniform amplitude, the number of such impulses being such that the autocorrelation function of the signal emitted presents correlation residues lower than a given fraction of the maximum amplitude of this function, and this signal is propagated in the medium in the form of waves, which, after being reflected by at least one reflector, are detected and recorded by at least one receiver system, as signals which are intercorrelated with the long signal in order to measure the time taken by the reflected waves to travel through the medium, the improvement being characterized by the fact that the long signal is emitted by a number of sources off-set laterally from one another and the receiver system, the moments of emission by each source being such that when the sequence of moments of emission by all the sources are intercorrelated with the sequence of moments of emission by any one source, a function is obtained, for a duration equal to the longest time taken by the waves being propagated in the medium to travel both ways through it, the ratio of the amplitude of the maximum peak of this function to the amplitude of the secondary residues being approximately the same as the ratio of the amplitude of the maximum peak to the amplitude of each of the secondary peaks of the autocorrelation function of the moments of emission of this same source.

In one embodiment of this improved method, the sources of emission are aligned at right angles to the direction of the receiver system, with one source on the same axis as this system.

The lateral distance between two consecutive sources is preferably the same as the distance between the receiver system and the source on the same axis as it.

In another embodiment of this improved method, several receiver systems are used, the waves emitted by each source being reflected by different reflectors and recorded by each receiver system. This allows a larger number of seismic sections in various directions.

In this improved method, there are at least two emission sources, either on the same level, as in underwater exploration, for instance, where the sources are at the surface, or on different levels, as in land prospecting, in which case results are adjusted to a single reference plane.

The invention is illustrated by, without being confined to, the following description, with the accompanying figures.

Figure 1:
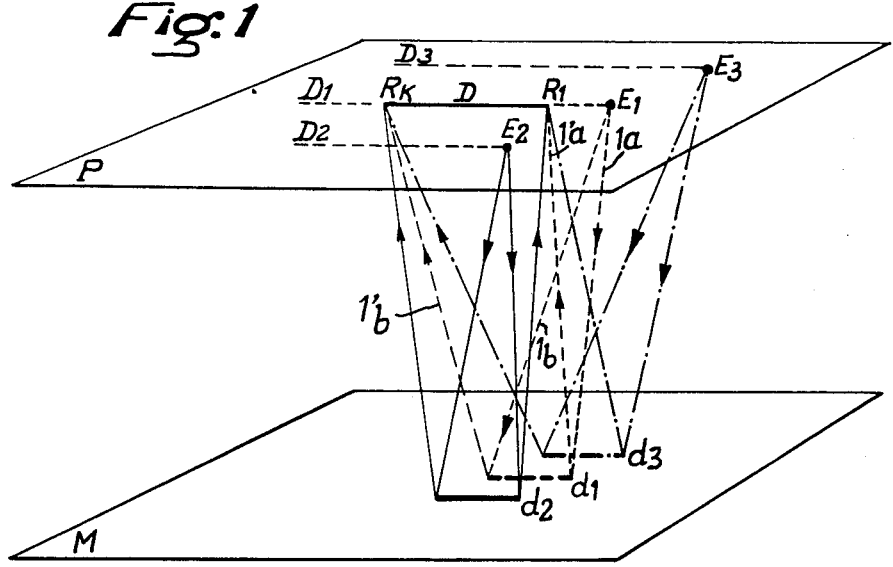
FIG. 1 shows the paths of the seismic waves emitted by three sources moving in three directions, and recorded, after reflection, by a single receiver system.

In the seismic prospection device shown in diagrammatical form in FIG. 1, the seismographic device or receiver system consists of a number of seismographs or detectors $R_1$ to $R_k$, situated on a line D. The first emission source $E_1$ moves along a line $D_1$ which merges with the receiver line D. The receiver system is also moving, at the same velocity, to keep the distance between the source $E_1$ and the first detector $R_1$ constant.

The other sources $E_2$ and $E_3$ are on a plane P defined by the straight line D and first source $E_1$, and they are moving in two directions $D_2$ and $D_3$ respectively, preferably parallel to line D or direction $D_1$ where these merge. They are placed on each side of the first source $E_1$ at approximately the same distance as the space between this first source and the nearest detector $R_1$.

The programme of emission by the sources $E_1$, $E_2$ and $E_3$ is selected in advance, so that the moments of emission of each source are such that when the sequence of moments of emission by all the sources are intercorrelated with the sequence of moments of emission by any one source, a function is obtained, for a duration T equal to the time taken by the signal being propagated in the medium to travel both ways through it, the ratio of the amplitude of the maximum peak to the amplitude of the secondary residues being approximately the same as the ratio of the amplitude of the maximum peak to the amplitude of each of the secondary peaks of the autocorrelation function of the moments of emission of this same source.

The sources may, for instance, be made to emit signals cyclically one after another, each source emitting a single impulse in each cycle.

The method may involve establishing an emission code in which the intervals of time between two consecutive moments of emission in the sequence of moments of emission by all the sources are multiples of one basic time unit, plus a fixed time unit, the sequence of multipliers being a series of random numbers, and the moments of emission of the order $3p + 1$ being assigned to source $E_1$, those of the order $3p + 2$ to source $E_2$, and those of the order $3p + 3$ to source $E_3$, where $p$ is an integer, equal to O or above.

This emission programme allows one to obtain correlation residues of the intercorrelation functions of the moments of emission by any one source $E_1$, $E_2$ or $E_3$ with the moments of emission by all the sources, lower than the residues of correlation of the autocorrelation function of the moments of emission by all the sources.

The first source $E_1$ sends out sound waves which are propagated in the ground, and certain components of which are reflected by a portion of reflector consisting of a segment $d_1$ of a reflecting plane M. The incident wave $1_a$ produces the reflected wave $1'a$, detected by $R_1$, while the incident wave $1b$ produces the reflected wave $1'b$, detected by $R_k$. The same happens with the waves emitted by $E_2$ and $E_3$, which are reflected on segments $d_2$ and $d_3$ of the reflecting plane M respectively. The receivers $R_1$ to $R_k$ simultaneously record the sound waves produced by the sources $E_1$ to $E_3$, after reflection on the segments $d_1$ to $d_3$.

Signals corresponding to each source are mixed during recording.

If $g_1(t)$, $g_2(t)$ and $g_3(t)$ are the functions representing the emission codes for sources $E_1$, $E_2$ and $E_3$ respectively, and $h_1(t)$, $h_2(t)$ and $h_3(t)$ are the functions sought, corresponding to the seismic recordings obtained when an emission has taken place at surface level, using the sources $E_1$, $E_2$ and $E_3$ respectively, what has been received by the detector or detectors is the sum of the products of convolution:

$$g_1(t) * h_1(t) + g_2(t) * h_2(t) + g_3(t) * h_3(t)$$

From the particular emission programme chosen for the sources, it is possible to distinguish the information in this mixture corresponding to the segments $d_1$, $d_2$ and $d_3$, by intercorrelating the signals received and recorded by the receiver system with the sequence of moments of emission by sources $E_1$, $E_2$ and $E_3$ respectively.

By intercorrelating, during an interval of time T, what is received by the detector or detectors with one of the emission functions defined above, the following result is obtained for source $E_1$:

$$G_{11}(t) * h_1(t) + G_{12}(t) * h_2(t) + G_{13}(t) * h_3(t)$$

where $G_{11}(t)$ is the autocorrelation function of $g_1(t)$, and $G_{12}(t)$ and $G_{13}(t)$ are the intercorrelation functions of $g_1(t)$ with $g_2(t)$, and $g_1(t)$ with $g_3(t)$.

Because of the choice of emission programme for the sources $E_1$, $E_2$ and $E_3$, the level of amplitude of the secondary residues $G_{12}(t) + G_{13}(t)$ is approximately the same as that of the residue of correlation of the function $G_{11}(t)$, so that the final result is physically identical with what would have been obtained if the source $E_1$ had been alone and had emitted with the code $g_1(t)$, in other words with the product of convolution $G_{11}(t) * h_1(t)$.

This intercorrelation can therefore be used to deduce the function $h_1(t)$ that is sought, without being bothered by the secondary terms $G_{12}(t) * h_2(t) + G_{13}(t) t * h_3(t)$, which are approximately the same as for the product of convolution of $h_1(t)$ by the secondary residues of $G_{11}(t)$.

Similarly, to work out the result that would be physically identical with the one obtained if either source had acted alone, the following expression is calculated for source $E_2$:

$$G_{22}(t) * h_2(t) + G_{23}(t) * h_3(t) + G_{21}(t) * h_1(t)$$

and the following for source $E_3$:

$$G_{33}(t) * h_3(t) + G_{31}(t) * h_1(t) + G_{32}(t) * h_2(t)$$

where $G_{22}(t)$ and $G_{33}(t)$ are the autocorrelation functions of $g_2(t)$ and $g_3(t)$ respectively, while $G_{23}(t)$, $G_{21}(t)$, $G_{31}(t)$ and $G_{32}(t)$ represent the intercorrelation functions for these functions.

Figure 2:
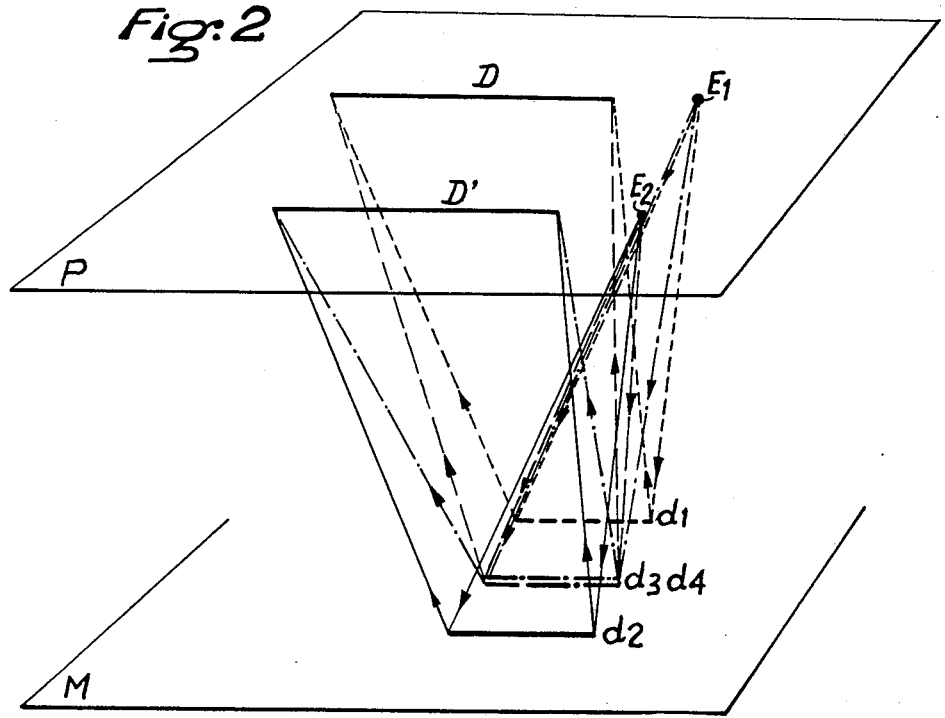
FIG. 2 shows the paths of the seismic waves emitted by two sources and recorded, after reflection, by two receiver systems.

FIG. 2 shows a seismic prospecting device, in diagrammatical form, with two emission sources $E_1$ and $E_2$ and two receiving systems D and D' in the form of two lines of receivers, with source $E_1$ on the same axis as D and $E_2$ on the same axis as D'.

Part the sound waves from the source $E_1$ is detected by the receiver system D, after being reflected by a segment $d_1$ of a reflecting plane M, while another part is detected by the receiver system D' after being reflected by a segment $d_3$ of the plane M.

Similarly, part of the waves from the source $E_2$ is detected by the receiver system D', after being reflected by the segment $d_2$, while another part is detected by the receiver system D, after being reflected by the segment $d_4$, which merges with $d_3$ because of the particular arrangement of the two emission sources.

The signals received by each receiver system are then processed as described above, to distinguish the information corresponding to the different reflecting segments $d_1$, $d_2$ and $d_3$.

What is claimed is:

1. A method of seismic prospecting of a medium which comprises the steps of:

transmitting into said medium from a plurality of emission sources laterally off-set from one another a long signal consisting of a series of separate energy impulses of substantially uniform amplitude, the series of impulses being such that the autocorrelation function of the series of impulses emitted from each source of said plurality of sources presents correlation residues lower than a given fraction of the maximum amplitude of the autocorrelation function and the intercorrelation function of the series of impulses from all of said emission sources with the series of impulses from any one source presents secondary residues the amplitude of which is approximately the same given fraction of the maximum amplitude of the intercorrelation function, receiving by means of a receiver system and recording said energy signals after reflection from reflectors in said medium, said receiving system being laterally off-set from at least one of said emission sources, and cross-correlating the recorded signals with the long signal emitted by each source for determining the travel time of the reflected signals in said medium.

2. An improved method as defined in claim 1, in which the sources of emission are aligned at right angles to the direction of the receiver system, with one source on the same axis as said receiver system.

3. An improved method as defined in claim 2, in which the lateral distance between two consecutive sources is the same as the distance between the receiver system and said one source.

4. An improved method as defined in claim 1, in which several receiver systems are used, and the energy impulses emitted by each source and reflected by different reflectors are recorded by each receiver system.

5. An improved method as defined in claim 1, in which the sources emit impulses cyclically one after another, each source emitting a single impulse in each cycle.

6. An improved method as defined in claim 5, in which the intervals of time between two consecutive moments of emission in the sequence of moments of emission by all the sources are multiples of one basic time unit, plus a fixed time unit, the sequence of multipliers being a series of random numbers.

* * * * *

UNITED STATES PATENT OFFICE
CERTIFICATE OF CORRECTION

Patent No. 3,811,111     Dated May 14, 1974

Inventor(s) MAURICE BARBIER and PHILIPPE STARON

It is certified that error appears in the above-identified patent and that said Letters Patent are hereby corrected as shown below:

The name of the Assignee should read:

--Societe Anonyme dite: Societe
Nationale Des Petroles d'Aquitaine--

IN THE SPECIFICATION

Column 3, line 64, correct the formula to read $--G_{12}(t) * h_2(t) + G_{13}(t) *--$.

Signed and sealed this 22nd day of October 1974.

(SEAL)
Attest:

McCOY M. GIBSON JR.
Attesting Officer

C. MARSHALL DANN
Commissioner of Patents